US011046425B2

(12) United States Patent
Wagner et al.

(10) Patent No.: US 11,046,425 B2
(45) Date of Patent: Jun. 29, 2021

(54) APPARATUS AND METHODS FOR ACTUATING A DOUBLE-SLOTTED FLAP USING A SLAVE SCREW

(71) Applicant: BOMBARDIER INC., Dorval (CA)

(72) Inventors: Paul Wagner, Grapevine, TX (US); Richard Harris, Kingston, WA (US); Matthew Goldmann, Midlothian, TX (US)

(73) Assignee: BOMBARDIER INC., Dorval (CA)

(*) Notice: Subject to any disclaimer, the term of this patent is extended or adjusted under 35 U.S.C. 154(b) by 284 days.

(21) Appl. No.: 16/302,869

(22) PCT Filed: Mar. 18, 2017

(86) PCT No.: PCT/US2017/033301
§ 371 (c)(1),
(2) Date: Nov. 19, 2018

(87) PCT Pub. No.: WO2017/201267
PCT Pub. Date: Nov. 23, 2017

(65) Prior Publication Data
US 2019/0291851 A1    Sep. 26, 2019

Related U.S. Application Data

(60) Provisional application No. 62/339,242, filed on May 20, 2016.

(51) Int. Cl.
*B64C 13/28* (2006.01)
*B64C 9/20* (2006.01)
(Continued)

(52) U.S. Cl.
CPC .............. *B64C 13/28* (2013.01); *B64C 9/16* (2013.01); *B64C 9/20* (2013.01); *F16H 25/20* (2013.01);
(Continued)

(58) Field of Classification Search
CPC .. B64C 13/28; B64C 9/16; B64C 9/20; B64C 9/04; B64C 9/00; B64C 23/00;
(Continued)

(56) References Cited

U.S. PATENT DOCUMENTS

| 2,404,956 | A | * | 7/1946 | Gouge | .................... B64C 9/16 244/216 |
| 2,518,854 | A | * | 8/1950 | Badenoch | ................ B64C 9/20 244/216 |

(Continued)

FOREIGN PATENT DOCUMENTS

| EP | 0960811 A2 | 12/1999 |
| FR | 52330 E | 12/1943 |

(Continued)

OTHER PUBLICATIONS

International Search Report and Written Opinion dated Jul. 31, 2017, for International Patent Application No. PCT/US2017/033301.

*Primary Examiner* — Medhat Badawi
(74) *Attorney, Agent, or Firm* — Karceski IP Law, PLLC

(57) ABSTRACT

Apparatus and methods for actuating a double-slotted flap movably coupled to an aircraft wing are disclosed. An exemplary method comprises actuating a first panel of the double-slotted flap relative to a structure of the aircraft wing, using motion of the first panel to induce rotation of a slave screw, and using the rotation of the slave screw to actuate the second panel relative to the first panel.

7 Claims, 7 Drawing Sheets

(51) Int. Cl.
*F16H 25/20* (2006.01)
*B64C 9/16* (2006.01)

(52) U.S. Cl.
CPC .............. *F16H 2025/2037* (2013.01); *F16H 2025/2043* (2013.01); *F16H 2025/2062* (2013.01); *Y02T 50/30* (2013.01)

(58) Field of Classification Search
CPC ..... F16H 2025/2037; F16H 2025/2043; F16H 2025/2062; F16H 25/20; F16H 2035/005; Y02T 50/30; Y10T 74/19721
See application file for complete search history.

(56) References Cited

U.S. PATENT DOCUMENTS

| | | | | |
|---|---|---|---|---|
| 3,126,173 A | * | 3/1964 | Alvarez-calderon | B64C 9/20 244/216 |
| 3,179,354 A | * | 4/1965 | Alvarez-Calderon | B64C 23/00 244/12.4 |
| 3,480,235 A | * | 11/1969 | Multhopp | B64C 23/005 244/216 |
| 3,528,632 A | * | 9/1970 | Putman | B64C 9/16 244/216 |
| 3,568,957 A | * | 3/1971 | Wood | B64C 9/16 244/216 |
| 3,698,668 A | * | 10/1972 | Cole | B64C 3/48 244/219 |
| 3,827,658 A | * | 8/1974 | Hallworth | B64C 9/16 244/216 |
| 3,944,170 A | * | 3/1976 | Musgrove | B64C 9/02 244/219 |
| 3,985,319 A | * | 10/1976 | Dean | B64C 9/16 244/216 |
| 4,040,583 A | * | 8/1977 | Bihrle, Jr. | B64C 9/00 244/113 |
| 4,049,219 A | * | 9/1977 | Dean | B64C 9/16 244/217 |
| 4,305,177 A | * | 12/1981 | Feifel | B64C 9/02 244/215 |
| 4,353,517 A | * | 10/1982 | Rudolph | B64C 9/20 244/216 |
| 4,381,093 A | * | 4/1983 | Rudolph | B64C 9/16 244/216 |
| 4,434,959 A | * | 3/1984 | Rudolph | B64C 9/16 244/215 |
| 4,447,027 A | * | 5/1984 | Wang | B64C 9/00 244/212 |
| 4,447,028 A | * | 5/1984 | Wang | B64C 9/00 244/212 |
| 4,448,375 A | * | 5/1984 | Herndon | B64C 9/16 244/216 |
| 4,471,928 A | * | 9/1984 | Cole | B64C 9/00 244/215 |
| 4,669,687 A | * | 6/1987 | Rudolph | B64C 9/16 244/215 |
| 4,702,442 A | * | 10/1987 | Weiland | B64C 9/16 244/216 |
| 4,784,355 A | * | 11/1988 | Brine | B64C 9/16 244/213 |
| RE32,907 E | * | 4/1989 | Rudolph | B64C 9/16 244/212 |
| 4,995,575 A | | 2/1991 | Stephenson | |
| 5,163,534 A | * | 11/1992 | Hillman | B64C 9/00 184/27.1 |
| 5,551,651 A | * | 9/1996 | Hendrickson | B64C 9/16 244/215 |
| 5,651,513 A | * | 7/1997 | Arena | B64C 9/16 244/99.3 |
| 5,788,190 A | * | 8/1998 | Siers | B64C 9/20 244/212 |
| 6,109,415 A | * | 8/2000 | Morgan | B64C 13/28 192/223.1 |
| 6,483,436 B1 | * | 11/2002 | Emaci | B64D 45/0005 244/194 |
| 8,714,479 B1 | * | 5/2014 | Chapman | B64C 13/341 244/99.3 |
| 2002/0047068 A1 | * | 4/2002 | Uchida | B64C 13/30 244/99.3 |
| 2006/0175468 A1 | * | 8/2006 | Huynh | B64C 9/323 244/212 |
| 2006/0202089 A1 | * | 9/2006 | Reckzeh | B64C 9/20 244/215 |
| 2008/0179464 A1 | * | 7/2008 | Bender | B64C 9/18 244/216 |
| 2010/0308162 A1 | * | 12/2010 | Gartelmann | B64C 9/20 244/99.3 |
| 2011/0127387 A1 | * | 6/2011 | Morris | B64C 9/26 244/216 |
| 2012/0091283 A1 | * | 4/2012 | Uchida | B64C 9/02 244/213 |
| 2012/0312931 A1 | * | 12/2012 | Recksiek | B64C 9/16 244/203 |
| 2014/0336865 A1 | * | 11/2014 | Catt | B64F 5/60 701/29.7 |
| 2014/0343784 A1 | * | 11/2014 | Brady | B64C 13/341 701/29.1 |
| 2016/0375987 A1 | * | 12/2016 | Shmilovich | B64C 3/185 244/207 |
| 2017/0088251 A1 | * | 3/2017 | Nfonguem | B64C 13/40 |
| 2019/0291851 A1 | * | 9/2019 | Wagner | B64C 9/20 |

FOREIGN PATENT DOCUMENTS

| | | |
|---|---|---|
| GB | 1227316 | 4/1971 |
| WO | 2015173755 A1 | 11/2015 |

* cited by examiner

APPARATUS AND METHODS FOR ACTUATING A DOUBLE-SLOTTED FLAP USING A SLAVE SCREW

CROSS-REFERENCE TO RELATED APPLICATIONS

This is a National Stage Entry into the United States Patent and Trademark Office from International PCT Patent Application No. PCT/US2017/033301, filed on May 18, 2017, which relies for priority on U.S. Provisional Patent Application Ser. No. 62/339,242, entitled "APPARATUS AND METHODS FOR ACTUATING A DOUBLE-SLOTTED FLAP USING A SLAVE SCREW," filed May 20, 2016, the entire contents of both of which are hereby incorporated by reference.

TECHNICAL FIELD

The disclosure relates generally to aircraft high-lift flight control surfaces, and more particularly to apparatus and methods for actuating a double-slotted flap coupled to an aircraft wing.

BACKGROUND OF THE ART

Flaps are a type of deployable high-lift device used to increase the lift of an aircraft wing at a given airspeed and are usually mounted at the trailing edge of a wing of a fixed-wing aircraft. Flaps can typically lower the minimum speed at which the aircraft can be safely flown. Flaps can also cause an increase in drag so they are typically retracted when not needed.

One common type of flap is the "double-slotted" type of flap that comprises a forward flap panel and an aft flap panel. The use of double-slotted flaps can require actuation mechanisms of increased complexity but the use of double-slotted flaps can nevertheless be desirable on some aircraft. Some known actuation mechanisms for double-slotted flaps have a significant height/thickness and therefore require fairings spaced apart on an underside of a wing in order to house such actuation mechanisms. The presence of such fairings disposed on a wing can produce drag which can affect fuel economy and consequently the range of an aircraft.

SUMMARY

In one aspect, the disclosure describes an apparatus for actuating a double-slotted flap movably coupled to an aircraft wing where the double-slotted flap comprises a first panel and a second panel movable relative to the first panel. The apparatus comprises:

an actuator configured to actuate the first panel of the double-slotted flap relative to a structure of the aircraft wing; and a slave-drive assembly configured to actuate the second panel relative to the first panel via a slave screw, the slave screw being configured to be induced to rotate by motion of the first panel.

The apparatus may comprise a drive screw drivingly coupled to the slave screw and configured to actuate the second panel.

The slave screw and the drive screw may be drivingly coupled in series via a universal joint.

The slave screw may have a first thread pitch and the drive screw may have a second thread pitch where the first thread pitch is greater than the second thread pitch.

The drive screw may be coupled to the second panel via a link comprising a frangible primary connection and a secondary connection. The frangible primary connection may comprise a shear pin.

The secondary connection may be configured to be looser than the primary connection. The secondary connection may be configured to permit backlash between the drive screw and the second panel. An amount of backlash between the drive screw and the second panel may be configured to cause a monitoring system to detect a fault.

The slave-drive assembly may comprise a drive nut engaged with the drive screw for transferring rotary motion of the drive screw into motion of the second panel relative to the first panel.

The slave-drive assembly may comprise:

a slave nut engaged with the slave screw and configured to be secured to the structure of the aircraft wing; and a motion transfer device configured to be secured to the first panel of the double-slotted flap for converting motion of the first panel into motion of the slave screw through the slave nut to induce rotation of the slave screw.

In another aspect, the disclosure describes an aircraft comprising an apparatus for actuating a double-slotted flap as disclosed herein.

In a further aspect, the disclosure describes a method for actuating a double-slotted flap movably coupled to an aircraft wing where the double-slotted flap comprises a first panel and a second panel movable relative to the first panel. The method comprises:

actuating the first panel of the double-slotted flap relative to a structure of the aircraft wing;

using motion of the first panel to induce rotation of a slave screw; and using the rotation of the slave screw to actuate the second panel relative to the first panel.

The method may comprise transferring the rotation of the slave screw to a drive screw for actuating the second panel.

The slave screw may have a first thread pitch and the drive screw may have a second thread pitch where the first thread pitch is greater than the second thread pitch.

The method may comprise actuating the second panel via a frangible primary connection.

The method may comprise retaining the second panel via a secondary connection upon loss of the primary connection. The secondary connection may be configured to permit backlash.

The method may comprise:

transferring the rotation of the slave screw to a drive screw for actuating the second panel, the actuation of the second panel being done via a frangible primary connection; and retaining the second panel via a secondary connection upon loss of the primary connection, the secondary connection being configured to permit backlash between the drive screw and the second panel.

The method may comprise detecting a fault due to an amount of backlash permitted by the secondary connection. The fault may be representative of an excessive skew of the second panel.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to apparatus and methods for actuating trailing edge high-lift devices such as double-slotted flaps. In some embodiments, the apparatus disclosed herein may be of relatively small height (i.e., low profile) so that relatively large drag-producing fairings on the underside of aircraft wings may not be required. In some embodiments, the apparatus disclosed herein may have a sufficiently small height so that the apparatus may be housed entirely inside the wing. Alternatively, in some embodiments and depending on the specific installation, the apparatus may require one or more relatively smaller fairings producing relatively less drag than larger fairings. Accordingly, in some embodiments, the apparatus and methods disclosed herein may contribute toward a more efficient aircraft wing of reduced drag and toward an improved fuel economy of an aircraft.

In some embodiments, the apparatus and methods disclosed herein may make use of a slave screw for the actuation of an aft panel of a double-slotted flap. The slave screw may be induced to rotate by the motion of a forward panel of the double-slotted flap actuated by an actuator so that a separate dedicated actuator/motor may not be required to actuate the aft panel of the double-slotted flap. The lack of a separate actuator/motor for actuating the aft panel may, in some embodiments, reduce complexity relative to known actuation systems for double-slotted flaps.

Aspects of various embodiments are described through reference to the drawings.

Figure 1:
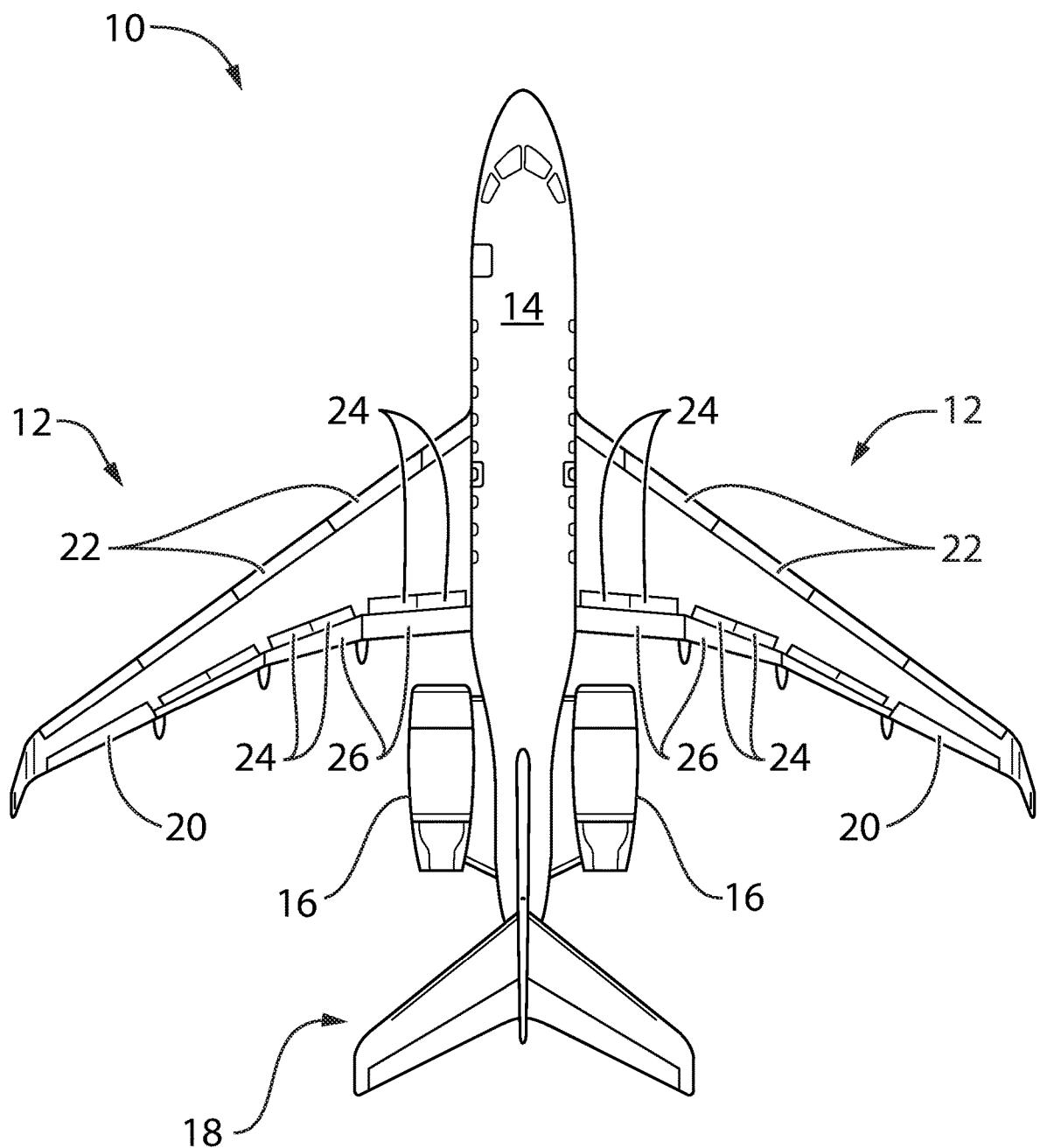
FIG. 1 is a top plan view of an exemplary aircraft comprising a double-slotted flap.

FIG. 1 is a top plan view of an exemplary aircraft 10 which may comprise an apparatus for actuating a double-slotted flap as disclosed herein. Aircraft 10 may be any type of aircraft such as corporate (e.g., business jet), private, commercial and passenger aircraft suitable for civil aviation. For example, aircraft 10 may be a narrow-body, twin-engine jet airliner. Aircraft 10 may be a fixed-wing aircraft.

Aircraft 10 may comprise one or more wings 12, fuselage 14, one or more engines 16 and empennage 18 of known or other type. One or more of engines 16 may be mounted to fuselage 14. Alternatively, or in addition, one or more of engines 16 may be mounted to wings 12. Wings 12 may each include one or more flight control surfaces such as aileron(s) 20, leading edge slat(s) 22, spoiler(s) 24 and trailing edge flap(s) 26. Leading edge slats 22 and trailing edge flaps 26 may be considered "high-lift" flight control surfaces that may be deployed to increase the amount of lift generated by wings 12 during landing, take-off and/or during any other appropriate phases of flight or conditions requiring increased lift. One or more trailing edge flaps 26 may be disposed at or near a trailing edge of each wing 12 and may define at least a portion of a trailing edge of each wing 12. At least one of trailing edge flaps 26 may be a double-slotted flap of known or other type and is referred to as "double-slotted flap 26" hereinafter.

Figure 2:
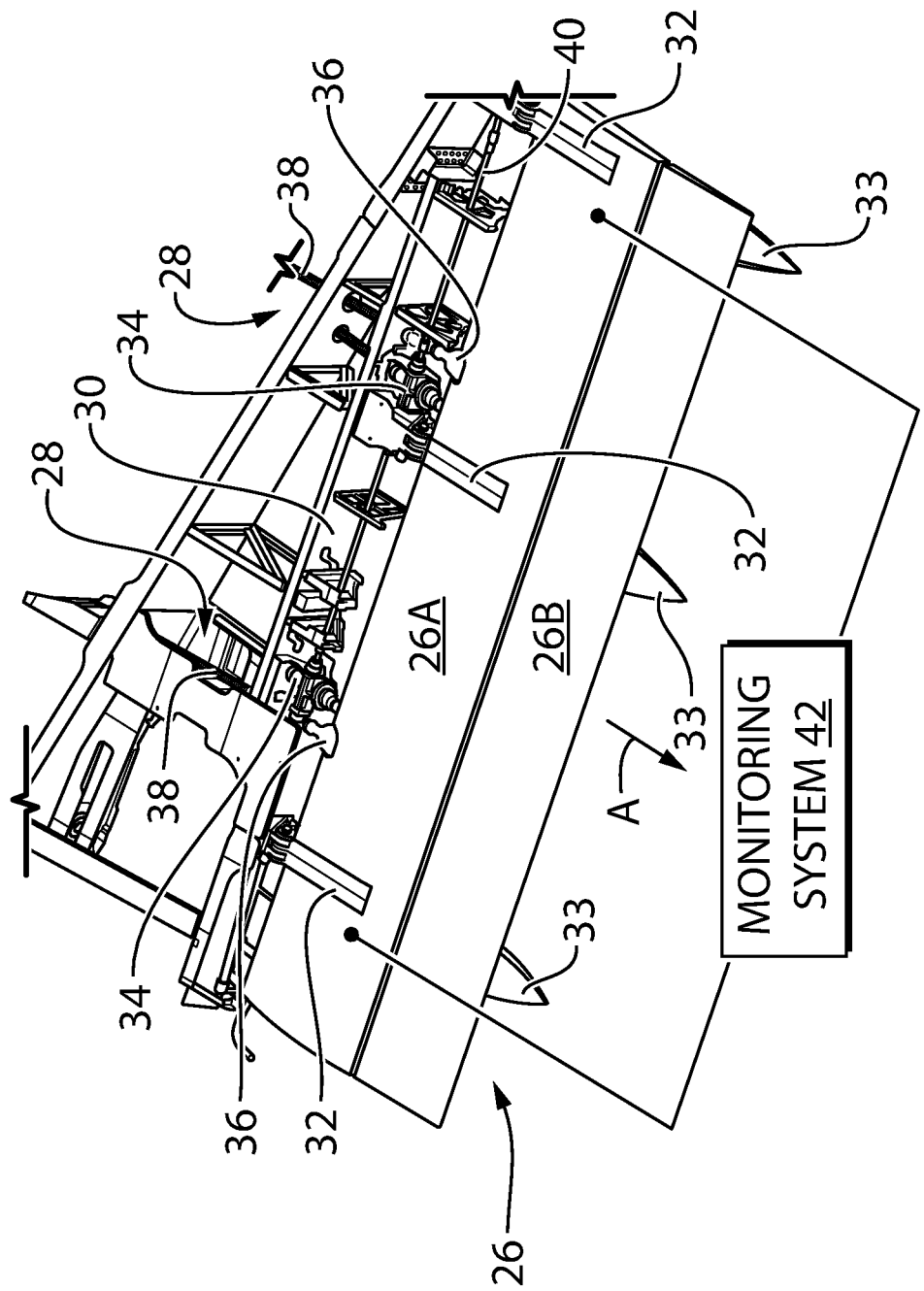
FIG. 2 is a perspective view of the double-slotted flap of the aircraft of FIG. 1 together with an exemplary apparatus for actuating the double-slotted flap.

FIG. 2 is a perspective view of an exemplary apparatus 28 (referred hereinafter as "actuating apparatus 28") for actuating double-slotted flap 26 of aircraft 10. FIG. 2 also shows some internal structure of wing 12 to which double-slotted flap 26 may be movably coupled. Double-slotted flap 26 may comprise first panel 26A and second panel 26B movable relative to first panel 26A. First panel 26A may comprise a forward panel of double-slotted flap 26 and second panel 26B may comprise an aft panel of double-slotted flap 26. In some embodiments, first panel 26A may define a larger surface area for interacting with the air than second panel 26B. For example, first panel 26A may have a longer chord length than second panel 26B in some embodiments. Alternatively, in some embodiments, first panel 26A may define a smaller surface area for interacting with the air than second panel 26B.

Double-slotted flap 26 may be movably coupled to one or more structural elements of wing 12 such as wing spar 30 for example. Double-slotted flap 26 may be configured for deployment along a trajectory that is generally along arrow A (e.g., aft and downward). In some embodiments, arrow A may at least partially correspond generally to a streamwise direction of the air flowing over wing 12 of aircraft 10. It is understood that the deployment trajectory of double-slotted flap 26 may not necessarily be linear and may be selected based on aerodynamic performance considerations. For example, in some embodiments, double-slotted flap 26 may be configured to undergo "Fowler" motion. The motion of double-slotted flap 26 may be guided at least in part by two or more tracks 32 spaced apart across the span of double-slotted flap 26. Similarly, a plurality of actuating apparatus 28 may be spaced apart across the span of double-slotted flap 26 in some embodiments. In some embodiments, tracks 32 may be housed in respective fairings 33.

As explained in more detail below, each actuating apparatus 28 may comprise actuator 34 configured to actuate first panel 26A of double-slotted flap 26 relative to a structure (e.g., wing spar 30) of wing 12, and, slave-drive assembly 36 configured to actuate second panel 26B relative to first panel 26A using slave screw 38. Rotation of slave screw 38 may be induced by way of motion of first panel 26A relative to wing spar 30 due to the actuation of first panel 26A by actuator 34. In other words, slave screw 38 may be caused to rotate by conversion of (e.g., linear) motion of first panel 26A relative to the structure (e.g., spar 30) of wing 12. Actuator 34 may comprise a screw type of actuator of known or other type or any other suitable type of actuator (e.g., linkages, bell-crank, etc.) suitable for actuating first panel 26A. In the exemplary embodiment illustrated in FIG. 2, actuator 34 is of the ball-screw type and is driven via torque tube 40 via suitable power transfer means. Actuator 34 may be driven by one or more hydraulic or electric motor(s).

FIG. 2 also schematically shows monitoring system 42 which may be configured to monitor at least some aspect of operation of double-slotted flap 26 and/or actuating apparatus 28. In some embodiments, monitoring system 42 may comprise one or more (e.g., position) sensors, one or more processors, and non-transitory machine-readable medium (i.e., memory) containing instructions executable by the one or more processors. In some embodiments, monitoring system 42 may be configured to detect a fault (e.g., malfunction) of double-slotted flap 26 and/or actuating apparatus 28 and generate a suitable warning signal advising, for example, a pilot of aircraft 10 accordingly. Alternatively or in addition, monitoring system 42 may be configured to initiate or carry out some (e.g., corrective) action upon detection of a fault of double-slotted flap 26 and/or actuating apparatus 28. In some embodiments, monitoring system 42 may, for example comprise skew detection capabilities of known or other type where monitoring system 42 may comprise a first sensor monitoring an inboard position of double-slotted flap 26 and a second sensor monitoring an outboard position of double-slotted flap 26. In some embodiments, monitoring system 42 may be configured to cause double-slotted flap 26 to remain at the position where the fault was detected and inhibit further actuation of double-slotted flap 26. In some embodiments, monitoring system 42 may be configured to initiate or carry out any suitable action permitting the safe operation of aircraft 10.

Figure 3:
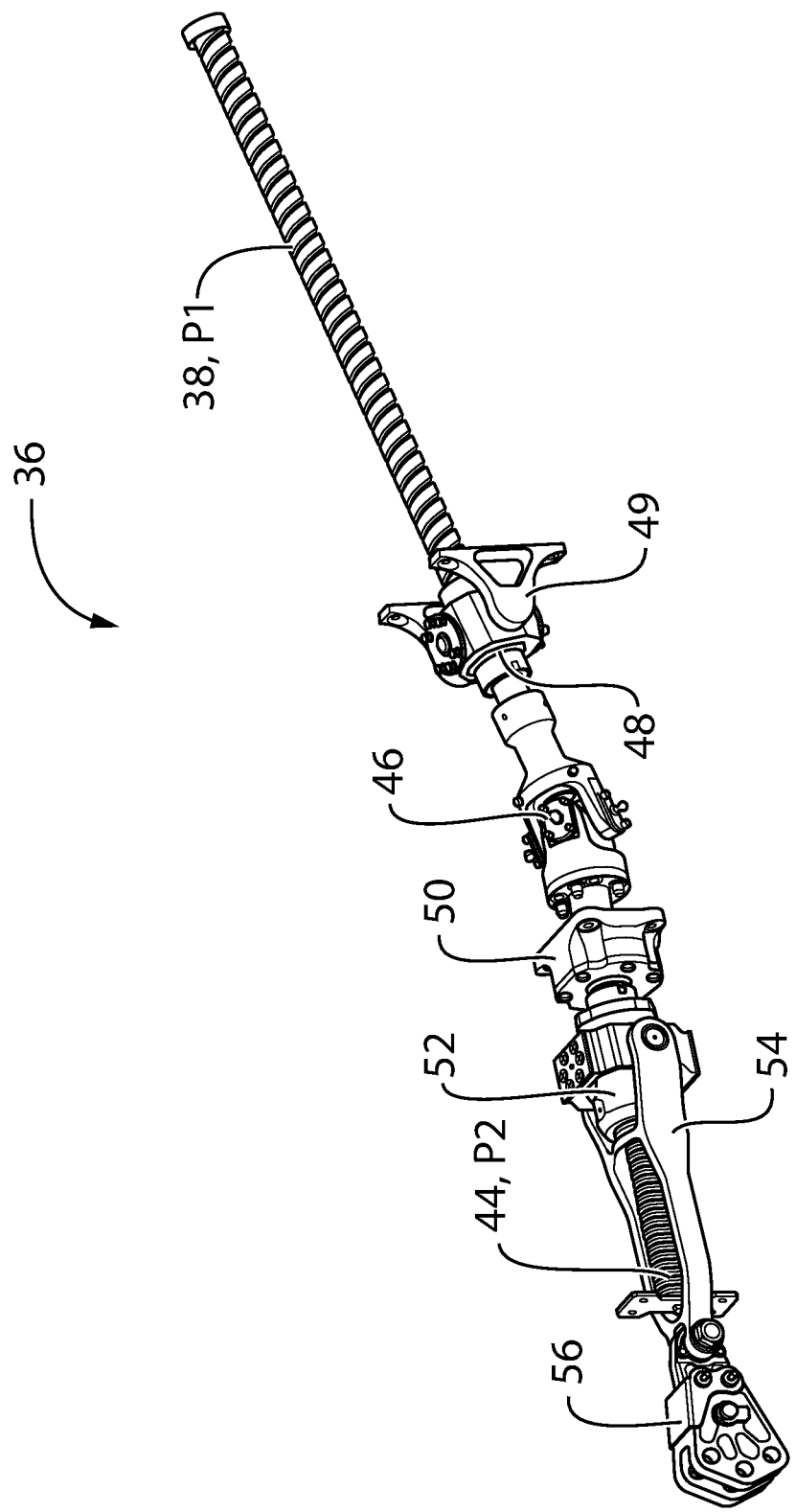
FIG. 3 is a perspective view of an exemplary slave-drive assembly of the apparatus of FIG. 2.

FIG. 3 is a perspective view of an exemplary slave-drive assembly 36 of actuating apparatus 28 shown in isolation. In various embodiments, slave-drive assembly 36 may comprise slave screw 38 and drive screw 44. Drive screw 44 may be drivingly coupled to slave screw 38 and configured to actuate second panel 26B relative to first panel 26A. In some embodiments, slave screw 38 and drive screw 44 may, for example, be drivingly coupled in series via universal joint 46 and thereby cooperate to define a load string. Universal joint 46 may permit drive screw 44 to be driven by slave screw 38 while still permitting misalignment between slave screw 38 and drive screw 44 to accommodate the movement of double-slotted flap 26 relative to wing 12. It is understood that rotation of slave screw 38 may be used to cause drive screw 44 to rotate via any known or other suitable motion transfer means, such as gears for example, so that drive screw 44 may be driven by slave screw 38. In some embodiments, the average rotation rate of drive screw 44 may be substantially the same as the average rotation rate of slave screw 38.

In some embodiments, slave-drive assembly 36 may comprise slave nut 48 engaged with slave screw 38 and configured to be secured to the structure of aircraft wing 12. For example, in some embodiments, slave nut 48 may be secured to wing spar 30 and slave screw 38 may extend through slave nut 48. In some embodiments, slave nut 48 may be a ball nut of known or other type. In some embodiments, slave nut 48 may be secured to wing spar 30 via bracket 49 where bracket 49 may permit some pivoting movement of slave nut 48 to accommodate a change in orientation of slave screw 38 during actuation of double-slotted flap 26. Bracket 49 may be configured to prevent rotation of slave nut 48 about a longitudinal axis of slave screw 38.

Slave-drive assembly 36 may also comprise motion transfer device 50 configured to be secured to a structure of first panel 26A of double-slotted flap 26 and may facilitate the conversion of motion of first panel 26A into axial motion of slave screw 38 through slave nut 48 to induce rotation of slave screw 38. Motion transfer device 50 may be configured to permit rotation of slave screw 38 and/or drive screw 40 to be transferred therethrough but may permit the transfer of an axial force onto slave screw 38 due to motion of first panel 26A. In some embodiments, motion transfer device 50 may, for example, be a thrust bearing of known or other type. In some embodiments, motion transfer device 50 may be disposed aft of universal joint 46 along the load string defined by slave screw 38, universal joint 46 and drive screw 44. Accordingly, the axial force transferred onto slave screw 38 from first panel 26A may be transferred via motion transfer device 50 and through universal joint 46.

Slave-drive assembly 36 may comprise drive nut 52 engaged with drive screw 44 and transferring rotary motion of drive screw 44 into motion of second panel 26B relative to first panel 26A. In some embodiments, drive nut 52 may be a ball nut of known or other type. Drive nut 52 may be coupled to second panel 26 via gimbal 54 and link 56. Link 56 may be secured to second panel 26B in a manner that prevents link 56 from turning. Accordingly, the connection established between drive nut 52 and link 56 via gimbal 54 may also prevent drive nut 52 from turning with drive screw 44 when drive screw 44 is driven by slave screw 38. Accordingly, the rotation of drive screw 44 may cause axial motion of drive nut 52 along drive screw 44. The axial motion of drive nut 52 along drive screw 44 may be transferred onto second panel 26B via gimbal 54 and link 56 so that second panel 26B may be actuated relative to first panel 26A. The actuation of first panel 26A and second panel 26B may be guided by tracks 32 (see FIG. 2) by way of suitable carriages of known or other type movably coupling first panel 26A and second panel 26B to tracks 32. Link 56 may be pivotally coupled to gimbal 54 to accommodate a change in orientation of second panel 26B relative to first panel 26A during actuation.

In some embodiments, slave screw 38 may have first thread pitch P1 and drive screw 44 may have second thread pitch P2 different from first thread pitch P1. In some embodiments, first thread pitch P1 may be greater than second thread pitch P2. First thread pitch P1 of slave screw 38 may be sufficiently large to permit rotation of slave screw 38 to be induced as it is forced through slave nut 48 but without requiring an excessive axial force for inducing such rotation. It is understood that a larger first thread pitch P1 of slave screw 38 may be associated with a lower axial force required to induce rotation of slave screw 38. Since the average rate of rotation of drive screw 44 may be substantially the same as that of slave screw 38, second thread pitch P2 of drive screw 44 may be selected to achieve the desired amount of actuation of second panel 26B based on first thread pitch P1 of slave screw 38 and the length of slave screw 38.

Figure 4A:
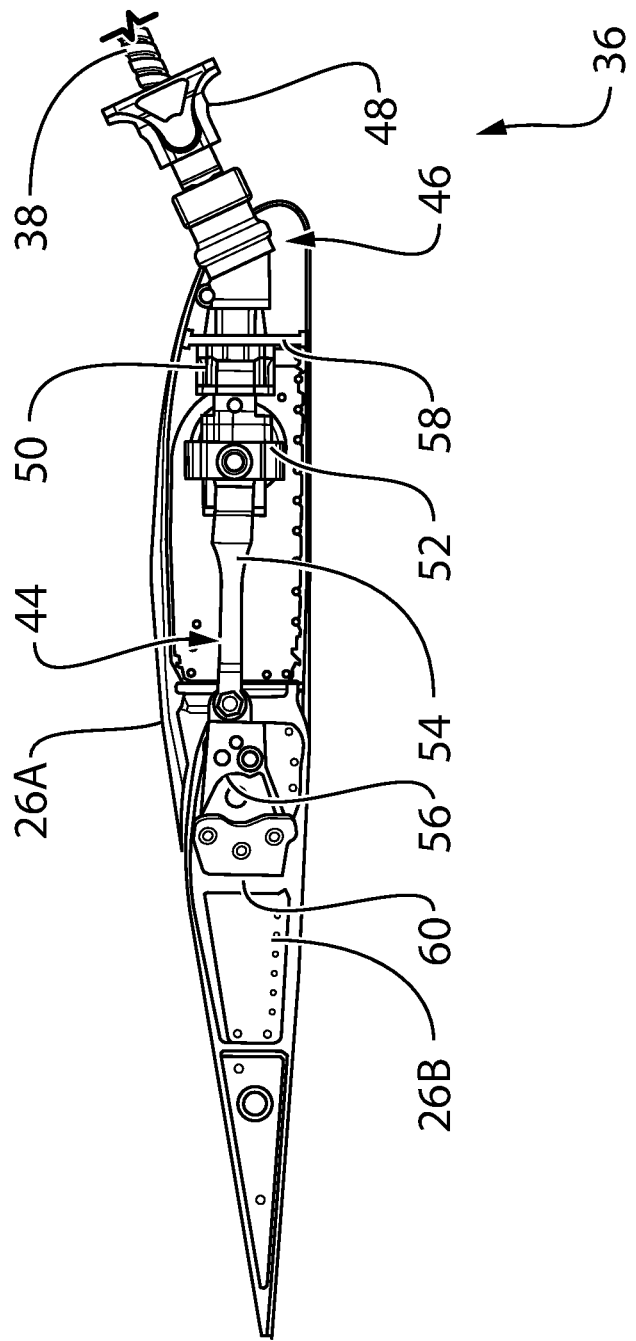
FIGS. 4A and 4B are side elevation views of the slave assembly of FIG. 3 together with the interior of the double-slotted flap of FIG. 2 respectively showing the double-slotted flap in a retracted position and in a deployed position.
Figure 4B:
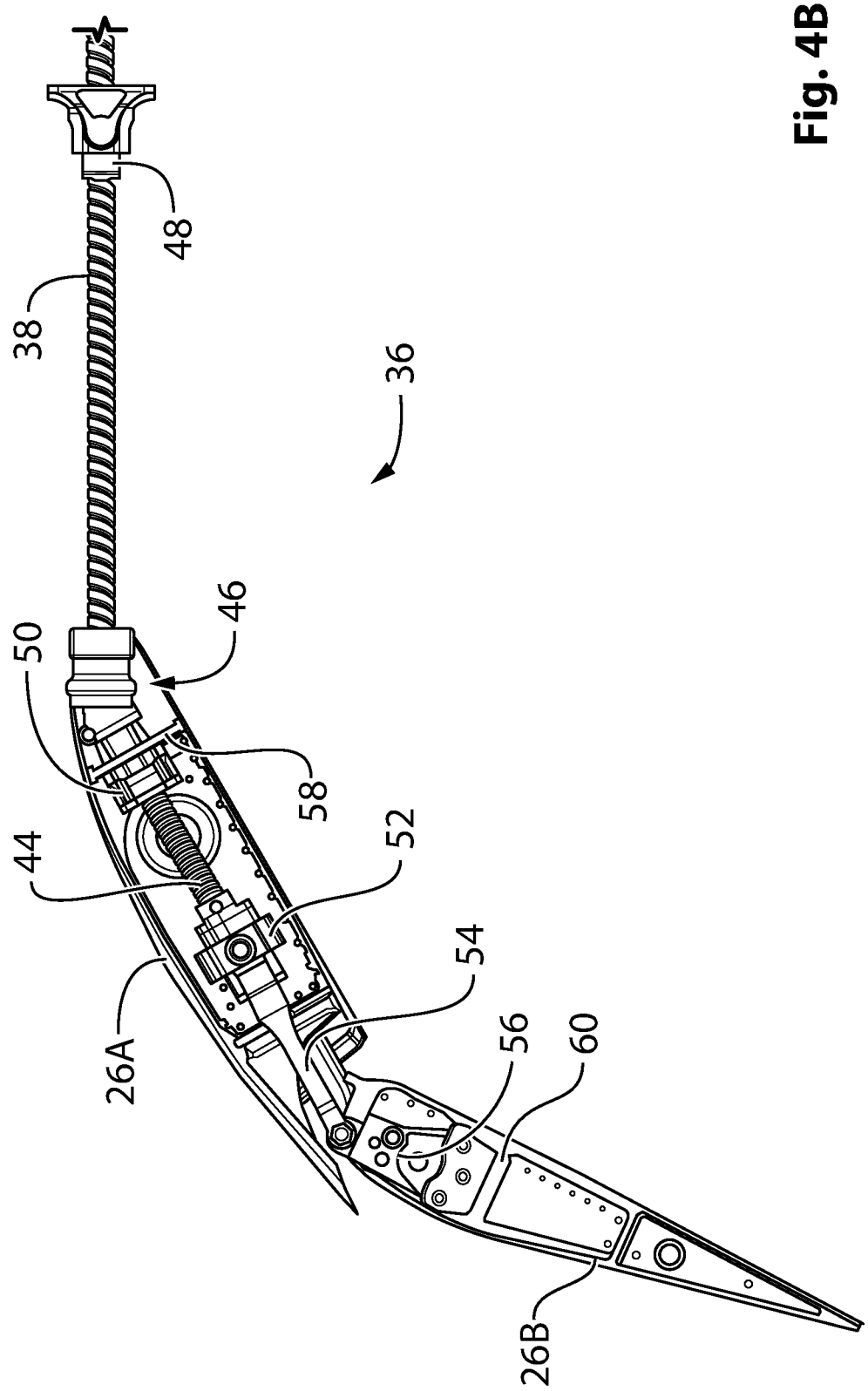

FIGS. 4A and 4B are side elevation views of slave assembly 36 and double-slotted flap 26 respectively showing double-slotted flap 26 in a retracted position and in a deployed position. As explained above, motion transfer device 50 may be secured to a structural component of first panel 26A such as, for example, first panel spar 58 so that motion of first panel 26A may be converted into axial motion of slave screw 38. Motion transfer device 50 and drive nut 52 may be housed inside first panel 26A. Link 56 may be secured to a structural component of second panel 26A such as, for example, second panel spar 60 so that motion of drive nut 52 along drive screw 44 may be transferred to second panel 26B so as to actuate second panel 26B relative to first panel 26A. It is understood that the structural connections between slave assembly 36 and the structural elements of double-slotted flap 26 may be direct or may be indirect via one or more intermediate load-transferring elements.

Figure 5:
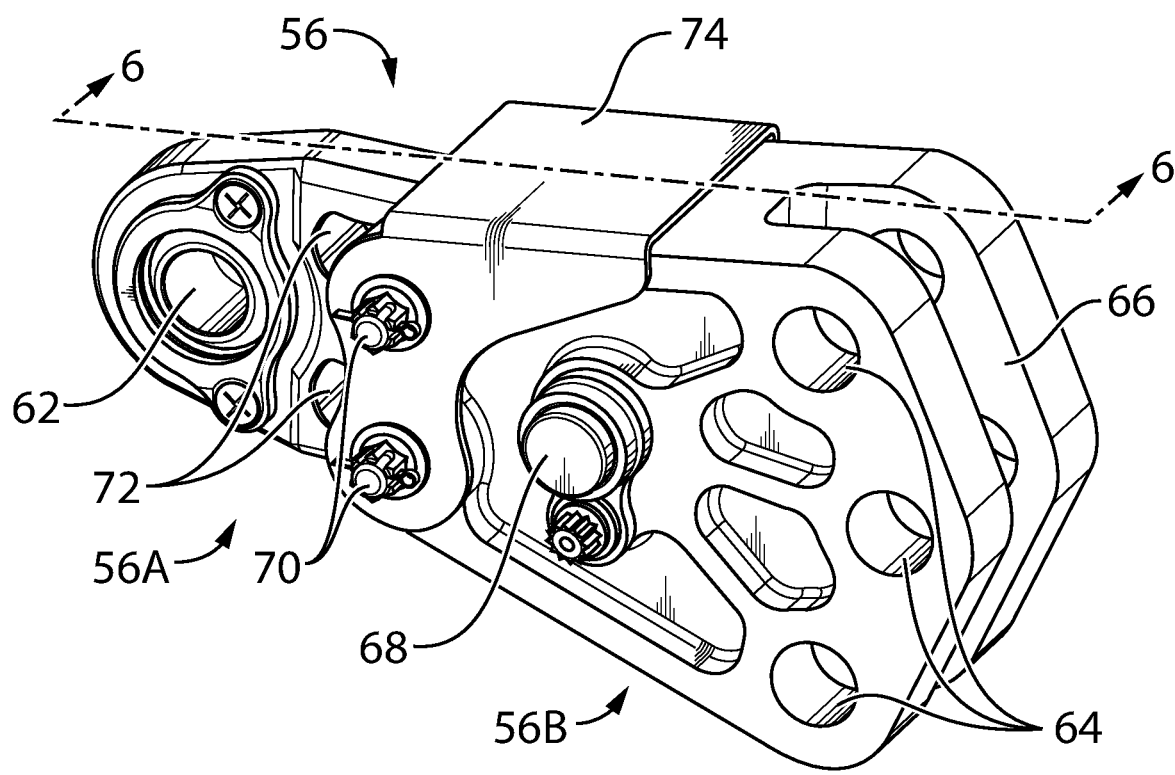
FIG. 5 is a perspective view of a link of the slave assembly of FIG. 3 for coupling to an aft panel of the double-slotted flap.
Figure 6:
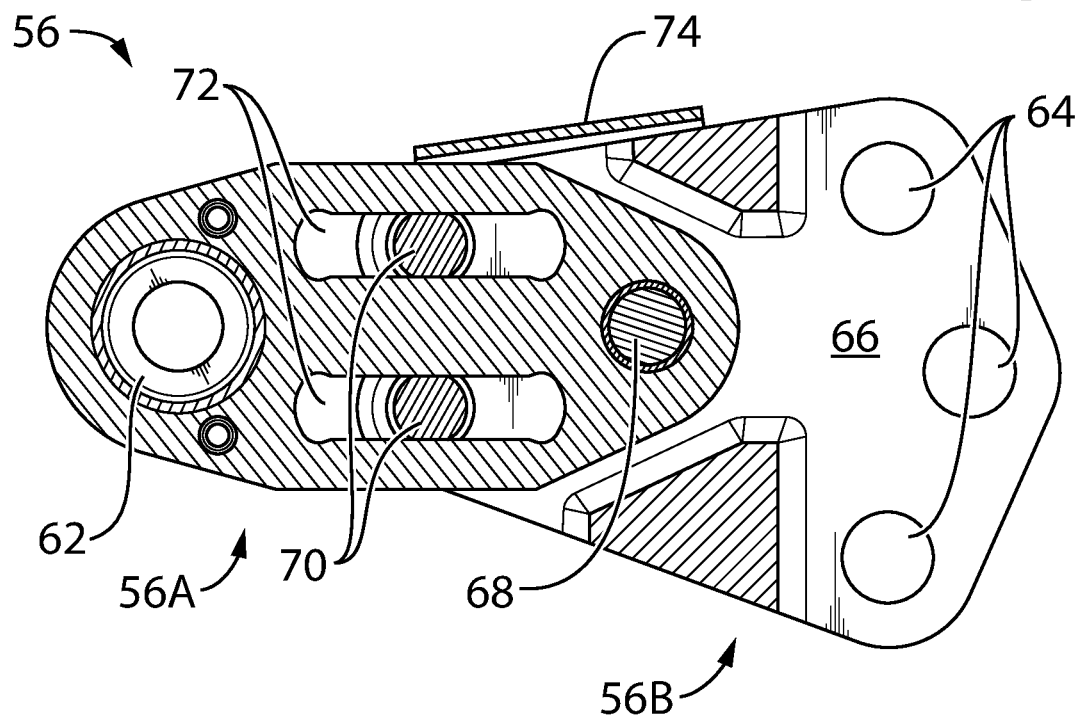
FIG. 6 is a cross-sectional view of the link of FIG. 5 taken along line 6-6 in FIG. 5.

FIG. 5 is a perspective view of link 56 of slave assembly 36 for coupling to second panel 26B and transferring the motion of drive nut 52 along drive screw 44 to second panel 26B. FIG. 6 is a cross-sectional view of link 56 taken along line 6-6 in FIG. 5.

In reference to FIGS. 5 and 6, link 56 may be coupled to drive nut 52 via gimbal 54. In some embodiments, link 56 may comprise first link portion 56A and second link portion 56B. First link portion 56A may be coupled to gimbal 54 via a suitable fastener (e.g., bolt, pin) extending through support bearing 62. Depending on the nature of motion of second panel 26B, support bearing 62 may, for example, be a spherical bearing or plain bushing. Second link portion 56B may be coupled to a structure of second panel 26B via one or more suitable fasteners extending though one or more corresponding holes 64. For example, a structural flange of second panel 26B may be received into coupling slot 66 so that fastener(s) extending through hole(s) 64 may also extend through the structural flange to thereby couple second link portion 56B to second panel 26B.

First link portion 56A and second link portion 56B may be coupled together via a frangible primary connection and a secondary connection so that drive assembly 36 may consequently be coupled to second panel 26B via such frangible connection. In some embodiments, such frangible connection may comprise shear pin 68. Shear pin 68 may be designed to shear under a predetermined amount of load between first link portion 56A and second link portion 56B. The predetermined amount of load necessary to cause shear pin 68 to shear may be selected to avoid causing structural damage to double-slotted flap 26 and/or any structure associated therewith in the event of a jam of second panel 26B.

In the event of a jam of second panel 26B where the rotation of drive screw 44 would cause shear pin 68 to shear, first link portion 56A and second link portion 56B would still be retained together via the secondary connection provided by one or more slider pins 70 extending through one or more corresponding slider slots 72. This secondary connection may be configured to be looser than the primary connection provided by shear pin 68. For example, the secondary connection may be configured to retain second panel 26B to slave-drive assembly 36 while permitting some backlash (play) between first link portion 56A and second link portion 56B and consequently permit backlash between drive screw 44 and second panel 26B. The amount of backlash provided by the secondary connection may be selected (e.g., by the length of slider slots 72) to cause monitoring system 42 to detect a fault associated with the operation of double-slotted flap 26. Such fault may be an amount of skew between an inboard portion of double-slotted flap 26 (e.g., of second panel 26B) and an outboard portion of double-slotted flap 26 (e.g., of second panel 26B) as detected using suitable position sensors for example. This way, the secondary connection may be configured to make use of a flap skew detection system of aircraft 10 for the purpose of detecting the loss of the primary connection (e.g., shear pin 68). Upon detection of such fault, monitoring system 42 may initiate or generate a suitable warning for a pilot of aircraft 10. In some embodiments, monitoring system 42 may initiate or carry out some corrective action permitting aircraft 10 to be flown safely. For example, in some embodiments, monitoring system 42 may be configured to cause double-slotted flap 26 to remain at the deployed/retracted position at which the fault occurred and to inhibit further actuation of double-slotted flap 26.

Link 56 may also comprise cover 74 to help protect slider slots 72 from contamination.

Figure 7:
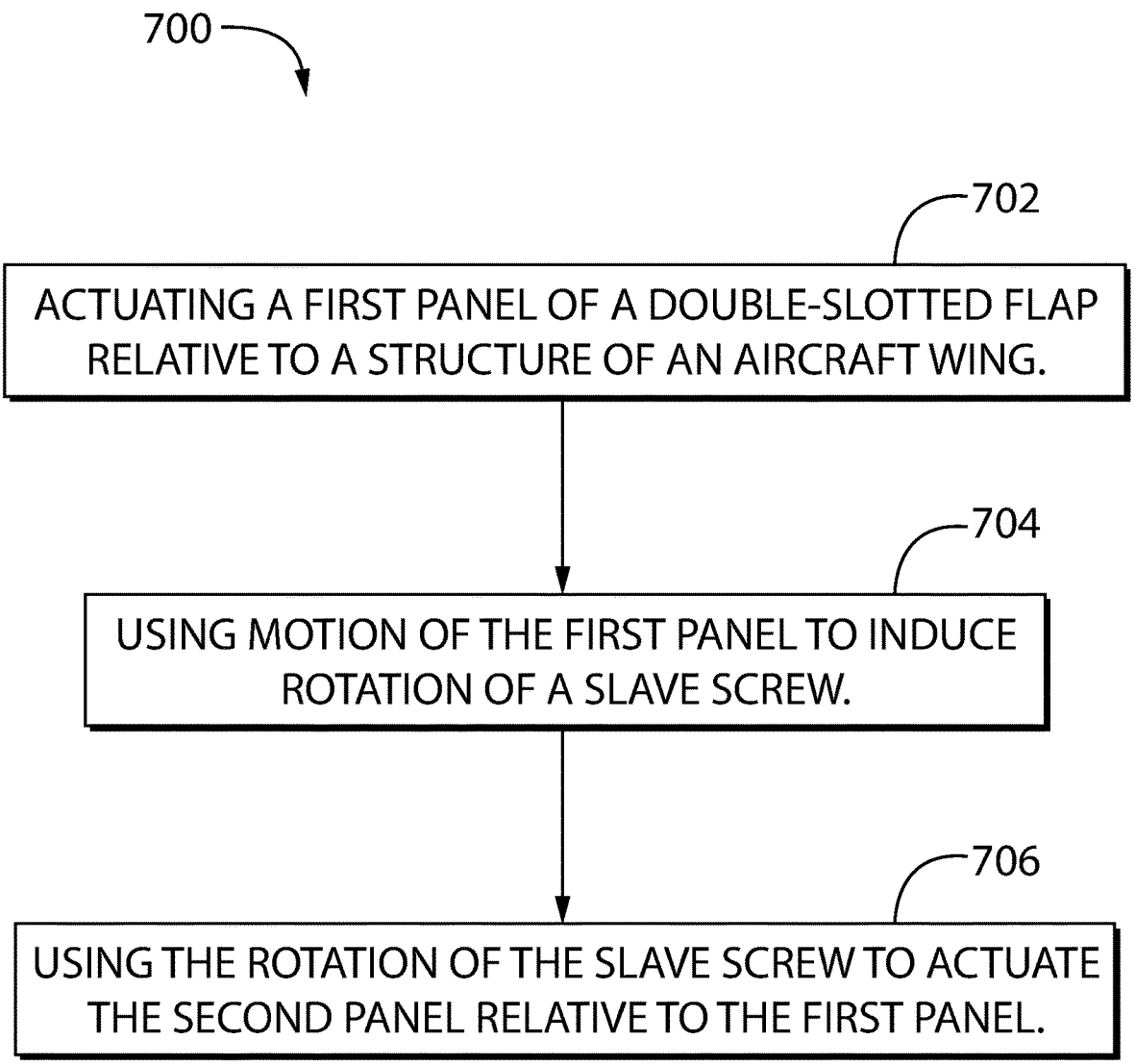
FIG. 7 is a flow chart illustrating a method for actuating a double-slotted flap.

FIG. 7 is a flow chart illustrating method 700 for actuating double-slotted flap 26 of aircraft 10. Method 700 may be performed in entirety or in part using apparatus 28 disclosed herein. Accordingly, aspects of apparatus 28 described herein are also applicable to method 700. Method 700 may be configured to actuate double-slotted flap 26 movably coupled to aircraft wing 12 where double-slotted flap 26 comprises first panel 26A and second panel 26B movable relative to first panel 26A. In various embodiments, method 700 may comprise: actuating first panel 26A of double-slotted flap 26 relative to a structure (e.g., wing spar 30) of aircraft wing 12 (see block 702); using motion of first panel 26A to induce rotation of slave screw 38 (see block 704); and using the rotation of slave screw 38 to actuate second panel 26B relative to first panel 26A (see block 706).

In some embodiments, method 700 may comprise transferring the rotation of slave screw 38 to drive screw 44 for actuating second panel 26B. As explained above, slave screw 38 may have first thread pitch P1 and drive screw 44 may have second thread pitch P2 where first thread pitch P1 is greater than second thread pitch P2.

In some embodiments, method 700 may comprise actuating second panel 26B via a frangible primary connection such as, for example, shear pin 68. Upon loss of the primary connection, method 700 may comprise retaining second panel 26B via a secondary connection such as, for example, slider pins 70 and slider slots 72 shown in FIGS. 5 and 6.

As explained above, the secondary connection may be configured to permit backlash. Accordingly, in some embodiments, method 700 may comprise detecting fault due to an amount of backlash permitted by the secondary connection. The fault may be an excessive skew of second panel 26B detected using monitoring system 42 for example.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, blocks may be added, deleted, or modified. The present disclosure may be embodied in other specific forms without departing from the subject matter of the claims. Also, one skilled in the relevant arts will appreciate that while the apparatus and methods disclosed and shown herein may comprise a specific number of elements/components, the apparatus and methods could be modified to include additional or fewer of such elements/components.

The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An apparatus for actuating a double-slotted flap movably coupled to an aircraft wing where the double-slotted flap comprises a first panel and a second panel movable relative to the first panel, the apparatus comprising:
   an actuator configured to actuate the first panel of the double-slotted flap relative to a structure of the aircraft wing; and
   a slave-drive assembly comprising:
      a slave screw; and
      a drive screw drivingly coupled to the slave screw and actuating the second panel relative to the first panel;
   wherein the slave screw is induced to rotate by motion of the first panel; and wherein the drive screw is coupled to the second panel via a link comprising a primary connection and a secondary connection, wherein the primary connection comprises a shear pin; and wherein the secondary connection allows a certain play with respect to the first connection so as to permit backlash between the drive screw and the second panel.

2. The apparatus as defined in claim 1, wherein the slave screw and the drive screw are drivingly coupled in series via a universal joint.

3. The apparatus as defined in claim 1, wherein the slave screw has a first thread pitch and the drive screw has a second thread pitch, and wherein the first thread pitch is greater than the second thread pitch.

4. The apparatus as defined in claim 1, wherein an amount of backlash between the drive screw and the second panel is configured to cause a monitoring system to detect a fault.

5. The apparatus as defined in claim 1, wherein the slave-drive assembly comprises a drive nut engaged with the drive screw for transferring rotary motion of the drive screw into motion of the second panel relative to the first panel.

6. The apparatus as defined in claim 1, wherein the slave-drive assembly comprises:
  a slave nut engaged with the slave screw and secured to the structure of the aircraft wing; and
  a motion transfer device secured to the first panel of the double-slotted flap for converting motion of the first panel into motion of the slave screw through the slave nut to induce rotation of the slave screw.

7. An aircraft comprising the apparatus as defined in claim 1.

\* \* \* \* \*